(12) United States Patent         (10) Patent No.:     US 8,538,574 B2
Hahn                              (45) Date of Patent:      Sep. 17, 2013

(54) METHOD AND APPARATUS FOR GENERATING CONTROL DATA FOR CONTROLLING A TOOL ON A MACHINE TOOL

(75) Inventor: Rudolf Hahn, Schwangau (DE)

(73) Assignee: DMG Electronics GmbH, Pfronten (DE)

( * ) Notice: Subject to any disclaimer, the term of this patent is extended or adjusted under 35 U.S.C. 154(b) by 699 days.

(21) Appl. No.: 12/659,998

(22) Filed: Mar. 26, 2010

(65) Prior Publication Data

US 2010/0292822 A1    Nov. 18, 2010

(30) Foreign Application Priority Data

Apr. 2, 2009  (DE) ............. 10 2009 015 934
Apr. 6, 2009  (DE) ............. 10 2009 016 338

(51) Int. Cl.
*G06F 19/00*    (2011.01)
(52) U.S. Cl.
USPC .............................. 700/159; 700/98; 700/186
(58) Field of Classification Search
USPC ............. 700/97, 98, 103, 159, 160, 171, 173, 700/174, 179, 180, 182, 184, 186
See application file for complete search history.

(56) References Cited

U.S. PATENT DOCUMENTS

| | | | | |
|---|---|---|---|---|
| 4,618,924 A * | 10/1986 | Hinds | | 700/86 |
| 4,757,461 A * | 7/1988 | Stohr et al. | | 345/419 |
| 4,833,617 A * | 5/1989 | Wang | | 700/173 |
| 4,879,667 A * | 11/1989 | Gorski et al. | | 345/419 |
| 4,905,418 A | 3/1990 | Wedeniwski | | |
| 5,703,782 A * | 12/1997 | Dundorf | | 700/182 |
| 6,021,358 A * | 2/2000 | Sachs | | 700/98 |
| 7,024,272 B2 * | 4/2006 | Thomas et al. | | 700/182 |
| 2001/0048857 A1 * | 12/2001 | Koch | | 409/132 |
| 2002/0095236 A1 * | 7/2002 | Dundorf | | 700/182 |
| 2003/0204285 A1 * | 10/2003 | Thomas et al. | | 700/182 |
| 2004/0128019 A1 | 7/2004 | Ikeda et al. | | |

(Continued)

FOREIGN PATENT DOCUMENTS

DE    198 07 343 A1    9/1998
DE    101 14 811 A1    10/2002

(Continued)

OTHER PUBLICATIONS

European Search Report issued in European Patent Application No. 10158911 dated Apr. 5, 2011 (with translation).

(Continued)

*Primary Examiner* — Charles Kasenge
(74) *Attorney, Agent, or Firm* — Oliff & Berridge, PLC

(57) ABSTRACT

The present invention relates to a method and apparatus for generating control data for controlling a predetermined tool on a machine tool for machining a workpiece clamped in the machine tool from a blank to a finished part. Machining geometry model data of a machining geometry of the workpiece at a machining time are compared with finished part geometry model data in order to determine a difference geometry between the machining geometry and the finished part geometry. On the basis of the determined difference geometry, a machining path is determined for the predetermined tool for removing material from the workpiece, and path data is generated such that a maximally large part of the volume of the difference geometry is removed per time unit in dependence of a maximum machining volume of the predetermined tool.

18 Claims, 7 Drawing Sheets

(56) References Cited

U.S. PATENT DOCUMENTS

| | | |
|---|---|---|
| 2005/0126352 A1 | 6/2005 | Suh et al. |
| 2007/0106418 A1* | 5/2007 | Hagen et al. .................. 700/186 |
| 2009/0144980 A1* | 6/2009 | Rangarajan et al. ......... 29/889.1 |

FOREIGN PATENT DOCUMENTS

| | | |
|---|---|---|
| DE | 10 2005 060 559 A1 | 6/2006 |
| EP | 0 342 528 A2 | 11/1989 |
| EP | 0 503 642 A2 | 9/1992 |
| EP | 0 798 616 A2 | 10/1997 |
| GB | 2 323 950 A | 10/1998 |

OTHER PUBLICATIONS

German Office Action issued in German Patent Application No. 10 2009 016 338.7; mailed on Mar. 19, 2010.

* cited by examiner

METHOD AND APPARATUS FOR GENERATING CONTROL DATA FOR CONTROLLING A TOOL ON A MACHINE TOOL

The present invention relates to a method and apparatus for generating control data for controlling a predetermined tool on a machine tool for machining a clamped workpiece from a blank to a finished part.

In particular, the invention relates to a method and apparatus for generating control data for controlling a predetermined milling tool on a CNC-controlled machine tool or a CNC-controlled machining center for machining a workpiece clamped in the machine tool from a blank to a finished part with an intended predetermined finished part geometry.

BACKGROUND OF THE INVENTION

CNC-controlled machine tools are well known from the prior art in the most diverse embodiments. CNC ("computerized numerical control") means that the machine tool is numerically controlled, i.e. by means of a CNC program comprising the CNC control data. The machine tool is equipped with a tool that removes material from the workpiece by machining. The control of the tool is performed by means of a control device on the basis of the CNC control data of the CNC program. This makes it possible to precisely machine a workpiece clamped in the machine tool on the basis of the determined CNC control data.

Today, CNC programs are written with the support of software by means of CAM systems (CAM for "computer-aided manufacturing"). A written CNC program comprises control data that controls an inserted tool in relation to a workpiece clamped in a machine tool along a generated path in order to remove material of the workpiece while the path is being traveled.

The prior art discloses devices and methods for simulating the machining of a virtual workpiece on a virtual machine tool, wherein the machining of the workpiece is visualized in a representation unit (display unit) and a user is able to evaluate the simulation in order to optionally establish or change modifications of the control data for controlling the tool.

Applicant's DE 10 2006 043390 A1 discloses a device and method for simulating a sequence for machining a workpiece on a machine tool for the simulation of sequences on CNC machines. The device comprises storage means for storing machine tool data for creating a virtual image of a machine tool, for storing workpiece data for creating a virtual image of a workpiece and for storing resource data for creating a virtual image of a resource. The data required for creating a realistic image of the machine tool are provided by these means. This does not only include a representation of the tool table and the workpiece but also the possibility to display the clamping situation in detail during the simulation. Furthermore, it is made possible to display the machine tool in different configurations including the workpiece and tool. The corresponding data is supplied to the overall simulation unit by the corresponding means. Thus, a machine tool equipped with a workpiece and tool is virtually available.

EP 0 524 344 A1 discloses a graphically interactive dialogue-oriented programming system for generating programs for controlling the machining process for a CNC machine tool. The dialogue-oriented program makes it easy for the user or operator to change, supplement or newly write control programs for a machine tool by a graphic dialogue guide as simply as possible.

JP 2001 282331 A discloses a tool simulation means suitable to simulate a real tool of a machine tool, the control being changeable for a machining by the tool. The simulation of the machining by the tool is displayed on a monitor.

U.S. Pat. No. 6,584,373 B1 discloses a method for controlling a CNC tool and a control system for controlling a CNC tool for a control in cyclically recurring sequences. The control system comprises a data input unit, a visualization unit, a machine tool check unit and an NC control unit. Here, the NC control unit includes at least one stored NC program for generating a movement sequence for the CNC tool.

The prior art path calculation for a CNC-controlled tool is based on geometric dimensions and orients itself on the intended finished part geometry of the workpiece. Control data is generated such that the material of the workpiece is removed layer by layer by a reciprocating motion of an inserted tool along simple paths until the finished part contour has been achieved. This is also referred to as line-by-line machining.

The machining volume along a machining path (removed material volume per time unit), i.e. the cutting performance of the tool in the material is determined by geometric dimensions. Starting from the blank geometry, a machining path is generated in a CAM system which orients itself on static machining volumes determined in cutting tables when the contour profiles of the workpiece geometry are uncritical, i.e. contour profiles that do not endanger the finished part geometry.

When the finished part contour is approached, only milling paths are generated that remove the remaining material under constant feed with different inserted tools by following the finished part contour. The machining period, that is, the time period required to reach the finished part contour by removing material, starting from the blank, is determined by the programmed feed rates and the determined machining path(s).

In order to reduce the machining period of a workpiece from a blank to a finished part, CAM systems known in the prior art generate one or more paths for a tool which reduce air cutting time. Air cutting time is the time for which a controlled tool is controlled in the machine tool without removing material from a clamped workpiece. Air cutting time occurs, for example, when the tool is guided from one point of the workpiece to another point of the workpiece in order to start a new machining path for removing material, with no material being removed from the workpiece during air cutting time. In contrast thereto, a machining path is a path along which the tool for removing material of the workpiece is controlled, i.e. a tool removes material from the workpiece along a machining path.

SUMMARY OF THE INVENTION

Starting from the prior art, the result is the object of the present invention to provide a method and an apparatus for generating control data for controlling a tool on a tool machine which enables a reduced machining period as compared to the prior art.

According to the invention, this object is achieved by a method having the features of claim 1 and an apparatus having the features of claim 11.

Advantageous developments and preferred embodiments of the invention will be described by the dependent claims.

The invention relates to a method for generating control data for controlling a predetermined tool on a machine tool for machining a clamped workpiece from a blank to a finished part, comprising the step of generating path data that indicates which machining path or machining paths an at least one predetermined tool is to travel at which feed rate and with which tool orientation relative to the workpiece in order to remove material from the workpiece by feed.

According to the invention, the method comprises the method steps of generating machining geometry model data of a machining geometry of the workpiece, which describes the current removal state of the workpiece at a particular machining time, providing finished part geometry model data which indicates a finished part geometry of the workpiece, generating difference geometry model data on the basis of a comparison of the machining geometry model data with the finished part geometry model data for determining a difference geometry between the machining geometry and the finished part geometry, generating path data including determining a machining path that is to be traveled by a predetermined tool for removing material of the determined difference geometry of the workpiece by feed on the basis of the generated difference geometry model data.

According to the invention, the path data are generated on the basis of the difference geometry model data, the path data furthermore indicating in addition to the determined machining path at which feed rate and with which tool orientation of the predetermined tool the latter is to travel the machining path determined on the basis of the difference geometry relative to the workpiece.

Here, the path data is generated according to the invention with the proviso that the predetermined tool removes a maximally large part of the volume of the particular difference geometry of the workpiece per time unit when traveling the machining path in dependence of a maximum machining volume.

Thus, the generation of control data including the associated machining path calculation is not only made, as in the prior art, on the basis of the finished part geometry but is additionally oriented on the achieved machining volume (removed material volume per time unit) and/or the machining volume that can be achieved by using a predetermined tool in dependence of the difference geometry in order to maximize the machining volume in dependence of the difference geometry.

By the step of generating machining geometry model data of a machining geometry of the workpiece, the current geometry of the workpiece can be determined at any time of the machining of the workpiece at this time so that the current removal state at this machining time is known.

The machining geometry is a geometry of the workpiece at any machining time upon machining the workpiece, that is, an intermediate state between blank and finished part geometries. Before material is removed from the workpiece, before a first predetermined tool removes material of the workpiece by feed, the machining geometry of the workpiece is identical with the blank geometry, and after the workpiece has been finished, the machining geometry is identical with the finished part geometry.

The provision of finished part geometry model data describing the finished part geometry of the workpiece enables a comparison of the finished part geometry and the machining geometry of the workpiece determined according to the invention in the last method step. Based upon the comparison, the position, site and geometry of the still projecting material of the workpiece can be determined, that is, the material still to be removed until the workpiece is finished at a particular machining time at which the first machining geometry model data is determined. Thus, it is possible to generate the difference geometry model data on the basis of the comparison of the machining geometry model data with the finished part geometry model data.

This offers the advantage that at any time of machining the workpiece it is possible to determine a current difference geometry of the workpiece at this time which difference geometry precisely corresponds to the material of the workpiece yet to be removed at this machining time. Thus it is possible to determine at any time of the machining which material has yet to be removed from the workpiece, including the geometry and shape of the material still to be removed.

On the basis of the determined current difference geometry model data it is possible to calculate a machining path by the difference geometry of the workpiece for having the predetermined tool travel with the proviso that the predetermined tool removes a maximally large part of the volume of the determined difference geometry of the workpiece per time unit when traveling the path in dependence of a maximum machining volume.

Apart from the purely geometrical path calculation, the path data is generated according to the invention such that in addition to the determined machining path it determines the feed rate and tool orientation along the path. In this case, the feed rate is an important parameter on which the achieved actual machining volume depends when the predetermined tool travels the path because a higher feed rate directly results in a higher machining volume.

Furthermore, the machining volume which can be achieved when the path is traveled depends on the orientation of the tool relative to the feed direction. In addition to machine tool parameters such as spindle performance or feed value of the axes, further parameters that determine the achievable machining volume and may be taken into consideration when determining the machining path are also, for example, the material of the workpiece, the diameter and height of the tool and/or the number of the blades of the tool.

According to the invention, the maximum machining volume of the predetermined tool represents the measure during the path calculation. It is the maximally admissible material volume which can be removed by the predetermined tool per time unit and thus indicates an upper limit for the achievable actual machining volume when material is removed from the workpiece.

The maximum machining volume of the predetermined tool is a tool-specific characteristic that depends on geometric characteristics and the material of the tool and may additionally depend on the material of the clamped workpiece.

Thus, an optimal reduction of the machining period results if the maximum machining volume of the predetermined tool is achieved at each point of the machining path as far as possible during the removing of material by the feed of the predetermined tool along the calculated machining path.

The method of the present invention achieves a considerable reduction of the total machining period in comparison to conventional methods in which the paths are only generated on the basis of the finished part geometry because in the inventive method the path calculation is made in addition to taking the finished part geometry into consideration in a machining volume-oriented manner and on the basis of a current difference geometry.

Preferably, the method furthermore comprises the step of selecting a tool of the machine tool including a comparatively high maximum machining volume in dependence of the difference geometry model data as the predetermined tool.

This is advantageous in that, when the workpiece is machined on a machine tool that comprises a plurality of tools having different maximum machining volumes and different tool characteristics, a tool may be selected as the predetermined tool for traveling the calculated path in dependence of the given circumstances of the determined current difference geometry so that a machining volume as high as possible can be achieved when a determined path is traveled. In this case, it is not necessarily the tool having the largest maximum machining volume that is determined as the predetermined tool but a tool is determined which can achieve an optimum machining volume as large as possible in dependence of the determined current difference geometry.

Preferably, the steps of generating machining geometry model data of the workpiece at a particular machining time, generating difference geometry model data on the basis of a comparison of the machining geometry model data with the finished part geometry model data and generating path data are continuously repeated in this sequence, wherein at least second machining geometry model data of a second machining geometry of the workpiece and second difference geometry model data at a particular second machining time after the at least one predetermined tool has traveled a first determined machining path on the basis of first path data, is generated upon a first repetition of the steps, wherein at least one second machining path is determined by generating second path data on the basis of the second difference geometry model data, which second path data is preferably generated with the proviso that a tool predetermined for the second machining path removes a maximally large part of the volume of the determined second difference geometry of the workpiece per time unit while traveling the second machining path in dependence of a maximum machining volume of this predetermined tool.

This offers the advantage that a workpiece can be machined in a plurality of machining steps from a blank to a finished part by removing material, wherein the plurality of machining steps comprises the traveling of a plurality of machining paths. Thus, it is possible to detect a new current machining geometry of the workpiece after a machining path has been traveled in order to detect a new current difference geometry so that a next machining path is determined by the path data on the basis of the new current difference geometry of the workpiece. Therefore, according to the invention, it is possible to achieve a machining volume as large as possible at any machining time when each of the machining paths of the machining steps is traveled.

As a predetermined tool during the machining of the workpiece in a plurality of machining steps comprising the traveling of a plurality of machining paths, it is necessary to respectively control the predetermined tool from one end point of a machining path to a starting point of the next machining path if the machining paths are not directly connected and one machining path adjoins the previous machining path. In this course, air cutting time may be caused which is taken into account in the overall machining time of the workpiece.

This results in a particularly advantageous possibility for a considerable reduction of the machining period if the control data of the machining of the workpiece is generated by a combination of the machining volume-oriented method according to the invention with an additional minimizing of air cutting time, wherein machining paths for removing material according to the inventive method are determined and air cutting time, i.e. the time of the movement of a tool from one end point of a machining path and the starting point of a next machining path, is additionally minimized. In this course, the plurality of machining paths is additionally determined with the proviso that air cutting time during control of the tool from one end point of a machining path to a starting point of a next machining path is minimal if the machining paths are not joined.

Preferably, the method for generating control data additionally comprises the step of providing tool procurement data which describes the tool procurement of the machine tool and indicates which tool characteristics the tools of the tool procurement of the machine tool have, and preferably the method step of selecting a predetermined tool having a comparatively high maximum machining volume in dependence of the current difference geometry model data as a predetermined tool is respectively performed for a next machining path. In addition thereto, the method of the present invention may optionally include the method step of determining a tool change of the previously predetermined tool by a tool selected for a next machining path in dependence of the tool procurement of the machine tool for the next machining path if another tool from the tool procurement of the machine tool than the previously predetermined tool is selected as the predetermined tool for the next machining path.

This offers the advantage that when the workpiece is machined in a plurality of machining steps, an optimum tool may be selected for each of the predetermined machining paths as the predetermined tool and optionally the tool predetermined for the machining path traveled in the previous machining step can be exchanged for by a tool selected as the predetermined tool for the next machining path in the next machining step.

Preferably, the machine tool comprises a control device for controlling the at least one predetermined tool, the control device enabling the control of the tool relative to the clamped workpiece with a three-dimensional free tool movement and a free tool orientation about at least 5 axes and the path data being preferably generated with the additional proviso that the at least one predetermined tool, when traveling a machining path determined on the basis of the current difference geometry, changes the feed direction, the feed rate and/or the orientation relative to the clamped workpiece in dependence of the current difference geometry.

This has the advantage that the tool orientation is freely movable relative to the workpiece, the at least 5 axes of the control device of the machine tool preferably comprising 3 linear axes and 2 rotatory axes in order to enable a particularly advantageous free mobility and orientability of the tool. Due to the free tool guide relative to the clamped workpiece resulting therefrom a plurality of geometrically complex curvilinear machining path courses is possible for the predetermined tool due to the difference geometry of the workpiece in addition to straight-lined path courses. Thus, it is possible to choose a machining path course that maximizes the achievable machining volume along the path course.

Therefore, the changeability of the feed rate and feed direction of the tool offers the specific advantage that a path may be calculated such that the changes of the feed rate and feed direction of the predetermined tool along the path may be controlled such that an actual machining volume as large as possible can be achieved. In doing so, a feed rate, feed direction and tool orientation is preferably always generated with the proviso that the machining volume is maximized in dependence of the maximum machining volume of the predetermined tool, while no material of the finished part geometry is additionally removed. It is preferred that the feed rate and feed direction change here continually along the path in dependence of the difference geometry.

The path data may be generated additionally in dependence of admissible performance parameters and/or kinetic characteristics of the machine tool such that the maximum performance parameters and/or kinetic characteristics of the machine tool are not exceeded when a predetermined tool travels the machining path determined on the basis of the path data.

This is advantageous in that no paths are calculated that exceed the admissible performance parameters of the machine tool and/or overload the kinetic characteristics of the machine tool. Performance parameters and kinetic characteristics of the machine tool are, for example, the performance of the spindles, feed performance of the linear axes, performance of the rotary axes, kinematically admissible feed values on linear and rotary axes and/or a maximally admissible load of clamping means or elements of the control device of the machine tool by forces and/or torques.

Additionally, the path data may be generated in dependence of one or more maximum load values of the at least one predetermined tool such that a load of the predetermined tool while the latter travels a machining path determined on the basis of the path data does not exceed the maximum load value(s) of the predetermined tool.

This offers the advantage that upon calculating the machining path, apart from the condition of optimizing the machine volume, one or more maximum load values of the tool should not be exceeded as an additional proviso and thus a path is always calculated and path data is always generated so that the maximum admissible load value(s) of the tool is/are not exceeded. Here, a load of the tool refers to forces and torques acting upon the predetermined tool while it travels the determined machining path. Thus, it is possible to avoid damage to the tool as no machining paths and path data are determined such that the maximally admissible load value(s) of the predetermined workpiece is/are exceeded.

Preferably, the method of the present invention comprises the continuously repeated method step of generating machine tool geometry model data, the machine tool geometry model data describing a current machine tool geometry at a particular machining time of the workpiece, wherein the current machine tool geometry preferably comprises a current relative orientation and relative position of the predetermined tool, of elements of the control device and of clamping means of the machine tool for clamping the workpiece at a particular machining time, wherein the path data is furthermore generated preferably on the basis of the machine tool geometry model data and/or on the basis of a comparison of the machine tool geometry model data with the machining geometry model data at the particular machining time with the additional proviso that a collision of elements of the machine tool with elements of the machine tool and of elements of the machine tool other than the predetermined tool with the workpiece while the tool travels the machining path is prevented by the at least one predetermined tool.

This has the advantage that a proactive collision check is performed. Thus, no machining paths are determined which lead to a collision of elements of the control device with clamping means of the machine tool, with the workpiece or with other elements of the machine tool when the predetermined tool travels the path. Apart from the clamping means of the machine tool, only the predetermined tool controlled by the control device comes into contact with the workpiece to be machined. This proactive collision check is particularly advantageous due to the machining path course which may optionally be complicated and curvilinear according to the invention in dependence of the difference geometry with an optionally continually changing feed direction, feed rate and/or tool orientation.

Preferably, the model data are respectively suited to generate a respective virtual 3D model of the blank geometry of the workpiece, the machining geometry of the workpiece, the finished part geometry of the workpiece, the difference geometry and/or the machine tool.

This offers the advantage that the generated and provided model data can be visually represented (e.g. displayed) in a virtual 3D model of the respective geometry. Thus, it is possible to indicate the respective machining state of the workpiece to a human operator, or it is possible to display the respective geometries individually or in combination. Furthermore, it is also possible to indicate a determined machining path by the displayed difference geometry or machining geometry to the human operator so that the human operator may check this determined machining path and, if necessary, take action for a change.

Preferably, the path data is generated on the basis of a simulation of the machining of a virtual workpiece on a virtual machine tool by one or more virtual predetermined tools, the simulation preferably comprising the steps of generating a virtual 3D model of the workpiece in a raw state, generating first path data including determining a first machining path for a virtual predetermined tool, simulating the traveling of the determined first machining path on the basis of the generated first path data by the virtual predetermined tool, generating machining geometry model data of a virtual 3D model of a machining geometry of the virtual workpiece, which describes a virtual removal state of the workpiece at a machining time after the traveling of the first determined machining path by a virtual predetermined tool was simulated, providing finished part geometry model data of a virtual 3D model of the finished part geometry, that describes a finished part geometry of the virtual workpiece, generating difference geometry model data which describes a difference geometry of the material which yet has to be removed from the virtual workpiece in order to reach the finished part geometry, and generating second path data including determining a second machining path on the basis of the difference geometry model data, the path data being generated with the proviso that the virtual predetermined tool removes a maximally large part of the volume of the difference geometry of the workpiece per time unit when simulating the traveling of the second machining path in dependence of a maximum machining volume for the predetermined tool.

This offers the advantage that the machining paths and the associated path data may be determined by simulating a virtual machine tool. A virtual machine tool for simulating a process for machining a workpiece on a machine tool for the simulation of processes on CNC machines is described in DE 10 2006 043390 A1, the disclosure of which is incorporated by reference in the present application.

By simulating the machining of a workpiece, it is also possible to cope with large data traffic due to the large data amounts of the 3D model data in a particularly advantageous manner because respective intermediate steps or individual machining steps may be simulated and/or stored. Furthermore, a simulation allows an operator to subjectively intervene in the simulated machining process by providing or changing simulation parameters. Optionally, the overall machining of the workpiece may be simulated with different predetermined tools or different tool changes. For example, it is possible to simulate different machining strategies, the respective machining strategies being compared with each other by means of the simulation so that it is possible to select an optimum machining strategy. For example, the machining strategy comprises the predetermined tool or tools, determined tool changes, starting and end points of machining paths, which optionally may be predetermined subjectively by the operator.

Thus, an optimal machining of the workpiece by simulation and iterative approach to the optimal machining with an optimally reduced machining period is possible. The simulation requires that a virtual predetermined tool be able to travel a determined machining path on the basis of path data, the machining volume along the machining path being calculated.

A simulation optionally enables an operator to furthermore subjectively influence the simulated machining process, subjectively select a new tool, subjectively adapt or modify a CNC part program wherein it is possible to visually represent (e.g. display) intermediate states of the machining process for the operator so that he or she is able to estimate the machining process and the associated intermediate states. Optionally, in case of particular intermediate states depending on the associated difference geometry, the operator may adapt a machining strategy. Optionally, the simulation may additionally be used with a view to security-relevant parameters to check the simulated machining process relating to safety.

Preferably, the path data is furthermore generated such that a machining path is determined in a plurality of interconnected machining path sections, a machining path starting point being determined in dependence of the difference geometry, wherein starting from the machining path starting point in dependence of the difference geometry, a first machining path section is determined that maximizes the machining volume starting from the machining path starting point and wherein starting from an end point of each of the plurality of interconnected machining path sections in dependence of the difference geometry a further machining path section is determined that maximizes the machining volume starting from the end point of the previous machining path section, wherein no material is removed along the first and the further machining sections from the finished part geometry.

This has the advantage that a machining path may be determined that is determined at each end point of a section with the proviso that a predetermined tool maximizes the machining volume in dependence of the maximum machining volume of the predetermined tool while traveling the determined path on the basis of the generated path data. In this course, the machining path sections are preferably determined to be so short that the feed direction, feed rate and/or tool orientation can possibly be adapted to the circumstances of the difference geometry after short machining path sections, with the proviso that a further machining path section is to be determined depending on the difference geometry so that the machining volume is maximized. Thus, it is possible to determine an entire machining path which is determined in a machining volume-optimized manner at each point of the machining path because the path course optimized according to the invention is determined by iterative optimizing and determination optimized sections of the path that are oriented on the machining volume.

According to the invention, in order to perform the method according to the invention there is provided an apparatus for generating control data for controlling a predetermined tool on a machine tool for machining a clamped workpiece from a blank to a finished part. The apparatus comprises a path data generating means for repeatedly generating path data that describes which at least one machining path an at least one predetermined tool is to travel for removing material of the workpiece by feed.

According to the invention, the apparatus for generating control data comprises a machining geometry model data generation unit for generating first machining geometry model data of a machining geometry of the workpiece, which describes the current removal state of the workpiece at a particular machining time, a finished part geometry model data provision unit for providing finished part geometry model data which describes a finished part geometry of the workpiece, a difference geometry model data generation unit for generating difference geometry model data on the basis of a comparison of the machining geometry model data with the finished part geometry model data for determining a current difference geometry between the machining geometry and a finished part geometry, and a path data generation unit for generating path data including the determination of a machining path which a predetermined tool is to travel for removing material of the determined current difference geometry of the workpiece by feed on the basis of the generated current difference geometry model data with the proviso that the predetermined tool removes a maximally large part of the volume of the difference geometry of the workpiece per time unit while traveling the machining path in dependence of a maximum machining volume for the predetermined tool.

Preferably, the apparatus furthermore comprises a machine tool parameter detection unit for detecting admissible performance parameters and/or kinetic characteristics of the machine tool, the path data generation unit generating the path data with the additional proviso that the maximum performance parameters and/or kinetic characteristics of the machine tool are not exceeded when a predetermined tool travels a machining path determined on the basis of the path data.

This offers the advantage that maximally admissible performance parameters and/or kinetic characteristics of the machine tool can be detected, the machining paths and the path data then being determined such that the detected performance parameters and kinetic characteristics are not exceeded.

Preferably, the apparatus furthermore comprises a tool characteristic detection unit for detecting tool characteristics of the tools of the machine tool, the tool characteristics including one or more maximum load values of the tools and the path data generation unit generating the path data with the additional proviso that one or more load values of the predetermined tool do(es) not exceed the maximum load value(s) of the predetermined tool when it travels the machining path determined on the basis of the path data.

This offers the advantage that one or more maximum load values of the predetermined tool are known, wherein it is then possible to determine the machining paths and path data such that the maximum load value(s) of the predetermined tool is/are not exceeded when it travels the machining path on the basis of the generated path data.

Preferably, the apparatus furthermore comprises a tool procurement detection unit for detecting the tool procurement of the machine tool, a tool selection unit for selecting a tool which has a comparatively high maximum machining volume in dependence of the current difference geometry model data as a predetermined tool for a next machining path and a tool change determination unit for determining a tool change of the previously predetermined tool by a predetermined tool selected for the next machining path in dependence of the detected tool procurement of the machine tool, the tool change determination unit preferably determining a tool change if for the next machining path a tool other than the previously predetermined tool is selected from the tool procurement of the machine tool by the tool determination unit as the predetermined tool for the next machining path.

This is advantageous in that the tool procurement situation of the machine tool can be detected to that the available tools and the related tool characteristics (e.g. the maximum machining volume) are known. Thus, it is possible to select the respective tool as a predetermined tool for which a machining path and the associated path data can be determined with an optimum, that is, achievable as large as possible, machining volume along the path. Furthermore, during machining in a plurality of machining steps it is possible to exchange another tool for the predetermined tool between two machining steps if the former enables a larger machining volume.

Preferably, the apparatus comprises a machine tool geometry model data generation unit for generating machine tool geometry model data which describes a current machine tool geometry at a particular machining time of the workpiece, the machine tool geometry preferably comprising a current orientation and position of the predetermined tool, of elements of the control device and of clamping means of the machine tool for clamping the workpiece. To this end, the path data is then preferably generated on the basis of the machine tool geometry model data and/or on the basis of a comparison of the machine tool geometry model data with the machining geometry model data at the particular machining time with the additional proviso that a collision of elements of the machine tool with elements of the machine tool and of elements of the machine tool other than the predetermined tool with the workpiece is prevented when the at least one predetermined tool travels the machining path determined by the path data.

This has the advantage that additionally to the geometry of the workpiece a current geometry of the machine tool at a particular time during the machining of the workpiece is also known or may be determined, the current machine tool geometry specifically comprising the current site and/or position of movable elements of the machine tool, such as the site and/or position of elements of the control device or of clamping means. Thereby, it is possible to preferably determine also a relative site and/or position between elements of the machine tool with other elements of the machine tool, such as, for example, between elements of the control device with clamping means.

Furthermore the advantage results that a comparison of the machine tool geometry and the machining geometry of the workpiece at any time during the machining of the workpiece is made possible. Thus, a relative site or position of the clamped workpiece elements of the machine tool, for example, particularly movable elements of the machine tool, e.g. of the control device or clamping means, can be determined.

Furthermore, the advantage results that by a comparison of the current machine tool geometry and the machining geometry of the workpiece it is possible to perform a path calculation such that when the path is traveled by the predetermined tool, no collisions between elements of the machine tool with elements of the machine tool and/or with the clamped workpiece occur.

This means that only paths can be calculated that enable the predetermined tool to travel the path in a collision-free manner. Specifically, collisions between elements of the control device with clamping means and collisions between elements of the control device with the clamped workpiece can be prevented.

Preferably, the apparatus furthermore comprises a display unit for visually representing (e.g. displaying) a virtual 3D model of the blank geometry, a virtual 3D model of the machining geometry, a virtual 3D model of the finished part geometry and/or a virtual 3D model of the machine tool.

This is advantageous in that at any time of the machining process of the workpiece on the machine tool the blank geometry, machining geometry, finished part geometry and/or difference geometry of the workpiece and/or the machine tool geometry can be indicated to a human operator for checking.

Preferably, the path data generation unit generates the path data by means of a simulation of the machining of a virtual workpiece on a virtual machine tool, the apparatus furthermore preferably comprising a machining simulation unit for simulating the traveling of a machine path determined on the basis of the path data generated by the path data generation unit by a virtual predetermined tool. Preferably, the machining geometry model data generation unit generates machining geometry model data of a virtual 3D model of a machining geometry of the virtual workpiece, which describes a virtual removal state of the workpiece at any machining time after the traveling of a first determining machining path by a virtual predetermined tool was simulated by the machining simulation unit.

Preferably, the finished part geometry provision unit provides finished part geometry model data of a virtual 3D model of the finished part geometry, which describes a finished part geometry of the virtual workpiece, wherein the difference geometry model data generation unit preferably generates difference geometry model data that describes a difference geometry of the material that has yet to be removed from the virtual workpiece in order to achieve the finished part geometry.

Preferably, the path data generation unit generates second path data that determines a second machining path on the basis of the difference geometry model data with the proviso that the virtual predetermined tool removes a maximally large part of the volume of the difference geometry of the workpiece per time unit upon simulation of the traveling of the second machining path by the machining simulation unit in dependence of a maximum machining volume for the predetermined tool.

This offers the advantage that a machining path and the related path data can be determined by the apparatus in a simulation of a virtual machine tool.

DETAILED DESCRIPTION OF THE PREFERRED EMBODIMENTS

Below, preferred embodiments of the present invention are described with reference to the figures.

Figure 1:
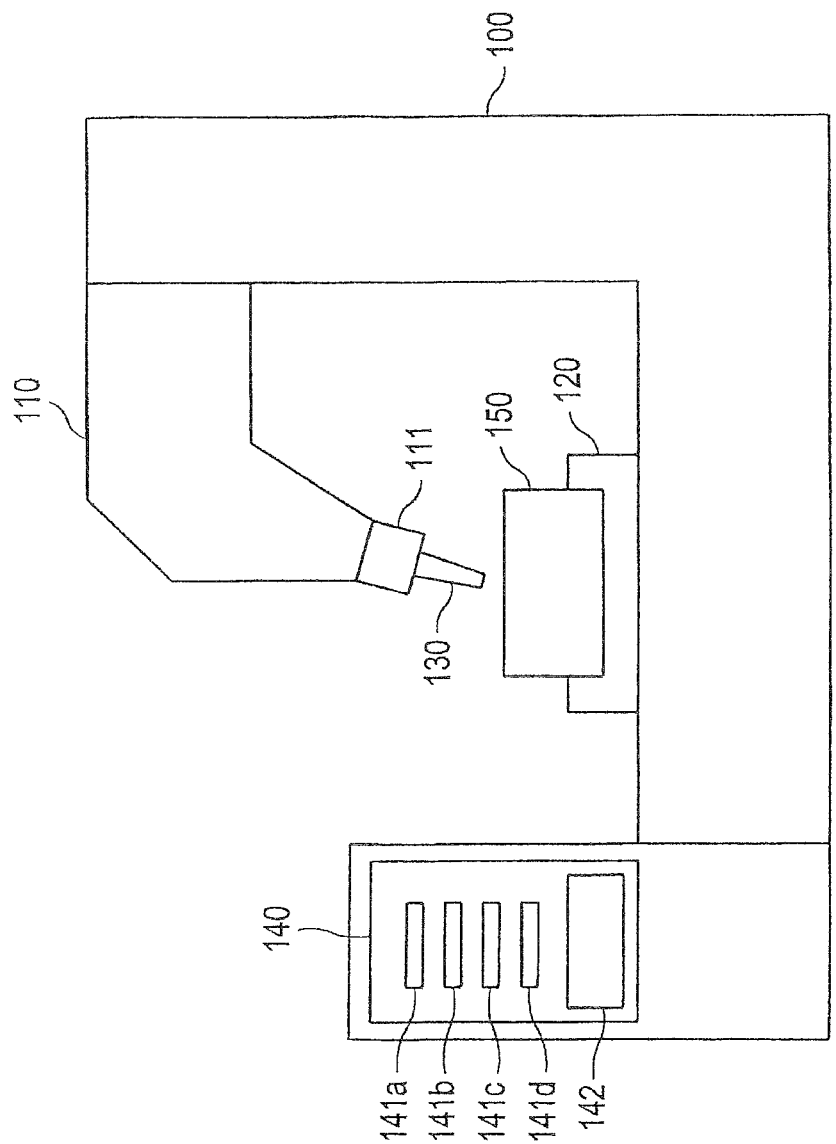
FIG. 1 shows a schematic illustration of a machine tool.

FIG. 1 shows a schematic illustration of a machine tool 100 for machining a clamped workpiece 150 from a blank to a finished part. The machine tool 100 comprises a control device 110, clamping means 120, a predetermined tool 130 and a tool magazine 140. The tool magazine comprises a plurality of tools 141a, 141b, 141c, and 141d. The control device 110 is equipped with the predetermined tool 130 and designed such that the control device 110 can control the predetermined tool 130 along a determined machining path for removing material of the workpiece. The workpiece 150 to be machined is clamped in the clamping means 120.

Furthermore, the tool magazine 140 comprises a tool changing device 142 for changing the predetermined tool 130, with which the control device 110 is equipped, by one of the tools 141a-d from the tool magazine 140. Thus, it is possible to equip the control device with each of the tools 141a-d and 130 so that the workpiece can be machined by each of the tools 141a-d and 130 after the control device 110 has been equipped with the respective tool by the tool changing device 142.

The various tools 141a-d and 130 on a machine tool differ in specific tool characteristics. Possible tool characteristics, for example, are the material or materials of the tool, the diameter and height of the tool, the number of blades of the tool, load values of the tool and a maximum machining volume of the respective tool. Here, the maximum machining volume of the tool mainly depends on the above-mentioned characteristics.

In this case, the machining volume is a parameter indicating how much material per time is removed. A common unit of the machining volume of tools of a machine tool is the unit of $cm^3$/min. Here, the tool characteristic of the height of the tool does not refer to the absolute height of the tool but to a height of the tool that can be used for machining material of the workpiece and therefore corresponds to a possible machining depth of the tool, that is, the depth to which a tool can enter a workpiece for removing material. The maximum machining volume of a tool may furthermore also depend on the material of the workpiece.

When the predetermined tool 130 travels a determined machining path through the workpiece 150, material of the workpiece 150 is removed. In this course, an actual machining volume, which is also measured in $cm^3$/min, is achieved that is smaller or maximally equal to the maximum machining volume of the tool. The machining volume actually achieved while traveling the determined machining path through the workpiece 150 depends on factors such as, for example, the feed rate of the predetermined tool 130 along the determined machining path through the workpiece 150, the performance of the spindle 111 that rotates the predetermined tool 130 about an axis for generating cutting speed, the material of the workpiece 150, the material of the tool 130, the diameter and height and the number of blades of the predetermined tool 130 and the tool orientation of the tool 130 relative to the clamped workpiece 150.

The machine tool 100 is a CNC machine tool, that is, the control device 110 is automatically controlled by CNC control data supplied to the machine tool 100. In this manner the predetermined tool 130 is controlled on the basis of the CNC control data.

The control device 110 of the machine tool 100 enables the control of the tool 130 relative to the clamped workpiece 150 with a three-dimensional, free tool movement and a free tool orientation about five axes. This comprises three linear axes so that the predetermined tool 130 can be moved three-dimensionally in all directions. The linear axes are disposed vertically to each other and respectively allow a linear movement of the tool, wherein complicated path profiles are made possible by simultaneously moving the linear axes. Furthermore, the free tool orientation relative to the clamped workpiece 150 is made possible by two rotary axes, one of the rotary axes enabling an oblique rotation of the tool (not to be confused with the rotation for generating cutting speed) and the second rotary axis enabling a rotation of the workpiece 150. Thus, negative angles of the tool 130 relative to the clamped workpiece 150 are additionally possible so that even a so-called undercut is made possible.

Figure 2:
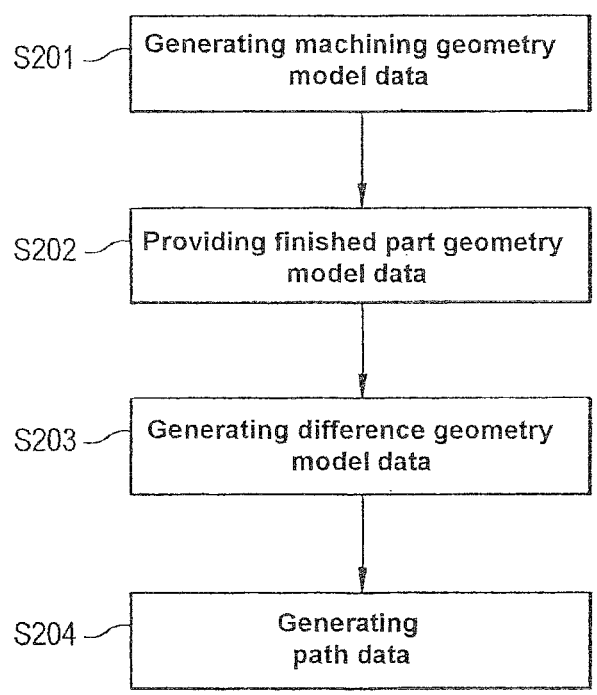
FIG. 2 shows a first embodiment of the method for generating control data according to the invention.

A first embodiment of the method for generating control data according to the present invention is shown in FIG. 2. The method for generating control data for controlling a predetermined tool on a machine tool for machining a clamped workpiece 150 from a blank to a finished part comprises the steps of generating machining geometry model data S201, providing finished part geometry model data S202, generating difference geometry model data S203 and generating path data S204.

Figure 3A:
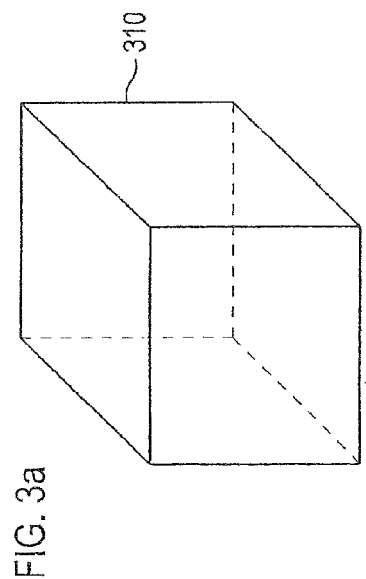
FIG. 3a shows a schematic illustration of a simple example of a blank geometry.

An explanation of the terms of machining geometry of the workpiece, finished part geometry of the workpiece and difference geometry of the workpiece shall be given below by means of an embodiment with reference to FIGS. 3a-d. FIG. 3a shows a cube as an example of a blank 310, which cube represents the blank of the workpiece as it is clamped into the machine tool 100 in the clamping means 120 at the start of the machining of the workpiece.

Figure 3B:
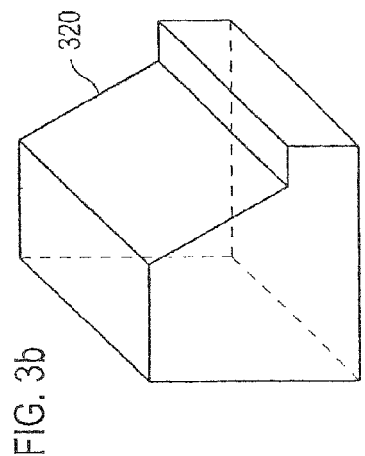
FIG. 3b shows a schematic illustration of a simple example of a machining geometry.
Figure 3C:
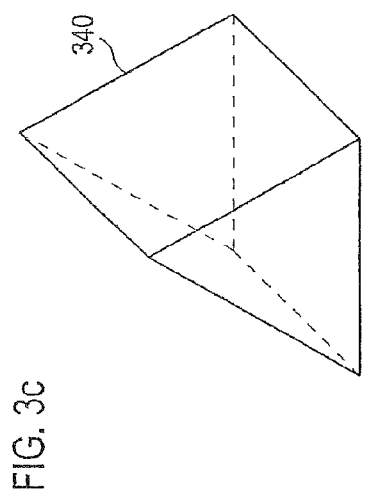
FIG. 3c shows a schematic illustration of a simple example of a finished part geometry.
Figure 3D:
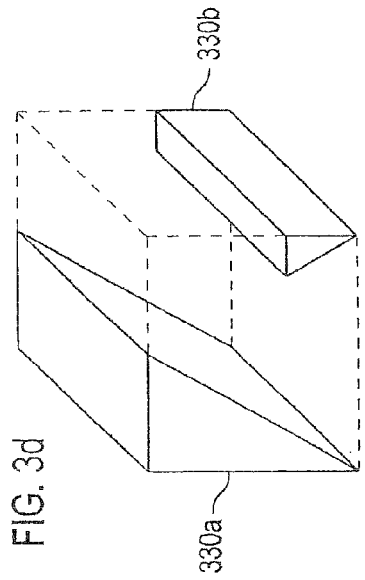
FIG. 3d shows a schematic illustration of a simple example of a difference geometry.

FIG. 3c exemplarily shows a finished part 340 to be achieved by machining the blank 310. FIG. 3b shows an example of a possible first intermediate state geometry of the workpiece at a first machining time $t_1$ after one or more predetermined tools 130 has/have removed material from the right upper side of the blank 310 along one or more machining paths. This represents the machining geometry 320 at the first machining time $t_1$. The material 330a and 330b yet to be removed of the first intermediate state 320 for achieving the finished part geometry of the finished part 340 results from a direct comparison of the finished part geometry of the finished part 340 with the machining geometry of the first machining geometry 320 at the first machining time $t_1$ and is shown in FIG. 3d.

The difference geometry 330a, b obtained in this manner precisely corresponds to the material that has yet to be removed until the finished part 340 is achieved. In FIG. 2, this corresponds to steps S201, "generating machining geometry model data", S202, "providing finished part geometry model data", and S203, "generating difference geometry model data".

The machining geometry 320 of a workpiece in the intermediate state is determined at a particular machining time $t_1$ and machining geometry model data is generated that indicates the machining geometry 320 at a first machining time $t_1$. In step S202, "providing finished part geometry model data", the model data of the finished part geometry 340 is provided, the finished part geometry model data indicating the geometry of the intended finished part, that is, the geometry of the workpiece as intended as the finished state after the machining by one or more of the tools 130 and/or 141a-d.

The comparison of the machining geometry model data with the finished part geometry model data is performed in step S203, "generating difference geometry model data", in which the model data is generated that describes the difference geometry 330a, 330b of the workpiece at the first machining time $t_1$ at which the machining geometry model data was also generated.

In the next step S204, "generating path data", a machining path is determined by the difference geometry 330a, b of the workpiece, which is to be traveled by the predetermined tool 130 for removing material of the workpiece 150 by feed.

Furthermore, in step S204, "generating path data", further path data as to the determined machining path is generated which additionally indicates at which feed rate and with which tool orientation relative to the workpiece the predetermined tool 130 is to travel the machining path determined in step S204.

According to the invention, the machining path and the path data are determined and generated, respectively, in this process such that the predetermined tool 130 removes a maximally large part of the volume of the difference geometry 330a, b determined in step S203 of the workpiece per time unit when traveling the machining path determined in step S204 in dependence of the maximum machining volume of the predetermined tool 130. Thus, the machining path is determined in step S204 and path data is generated, the difference geometry model data generated in step S203 being taken into consideration.

In this course, the machining path is determined by the difference geometry 330a, b of the predetermined workpiece 150 so that an actual machining volume as large as possible is achieved when the predetermined tool 130 travels the machining path. At best, the maximum machining volume of the predetermined tool 130 is achieved. Furthermore, the machining path is determined so that only a volume of the determined difference geometry 330a, b is removed when the predetermined tool 130 travels the determined machining path. This means that the predetermined tool 130 does not remove any material of the finished part geometry 340 when it travels the determined machining path.

In step S204, "generating path data", the free tool movement and the free tool orientation relative to the workpiece 150 is used to continually adjust and amend the feed direction, the feed rate and/or the tool orientation in order to achieve an actual machining volume as large as possible when the predetermined tool 130 travels the machining path. If possible, the maximum machining volume of the predetermined tool is to be achieved.

According to the invention, depending on the shape of the difference geometry at the first machining time $t_1$, this leads to complex, curvilinear path courses, wherein changes of direction of the feed direction of the predetermined tool 130 along the machining path are respectively determined such that an actual machining volume as large as possible can be achieved through the change of direction after a change of direction by the predetermined tool 130. In particular, the machining path is determined such that after a change of direction along the path a larger machining volume can be achieved than by a straight-lined feed direction without a change of direction.

Thus, in the method according to the invention it is not by simply reciprocating the predetermined tool 130 along straight-lined paths that layer by layer of the workpiece are removed in slices until the finished part geometry 340 is achieved, as in the so-called line-by-line machining of the prior art. In contrast to line-by-line machining, when the machining path determined in step S204 is traveled on the basis of the generated path data, a feed rate, direction of movement and tool orientation relative to the workpiece 150 are changed such that the actually achieved machining volume is maximum when the predetermined tool 130 travels the determined machining path in dependence of the circumstances of the difference geometry 330a, b.

Thus, it can be ensured that during the feed movement material is continually removed, that is, the period of time during which the tool moves through the air without touching the material can be considerably reduced. In addition thereto, it can be ensured by determining the machining path on the basis of the maximum machining volume of the predetermined tool that in case of a predetermined path length a maximum actual removal of material is ensured that depends on the difference geometry and of the maximum machining volume of the predetermined tool.

Thus, according to the invention the determination of the machining path and the generation of the path data are oriented not only on the finished part geometry 340 of the workpiece but also on the difference geometry 330a, b and the maximum machining volume. Thereby, it is possible to considerably reduce the machining time when machining the workpiece 150 from a blank to a finished part by the method for generating control data according to the invention.

In a second embodiment of the method for generating control data according to the present invention, a plurality of machining paths is determined in sequence, wherein a difference geometry as to the current machining state is always determined after the determined machining path has been traveled by the predetermined tool 130 and before another machining path is determined. This respectively requires current machining geometry model data to be generated at a current machining time $t_n$ which detects the machining of the workpiece 150 since the generation of the previous machining geometry model data at the machining time $t_{n-1}$ so that the current difference geometry at the machining time $t_n$ can be determined.

Figure 4B:
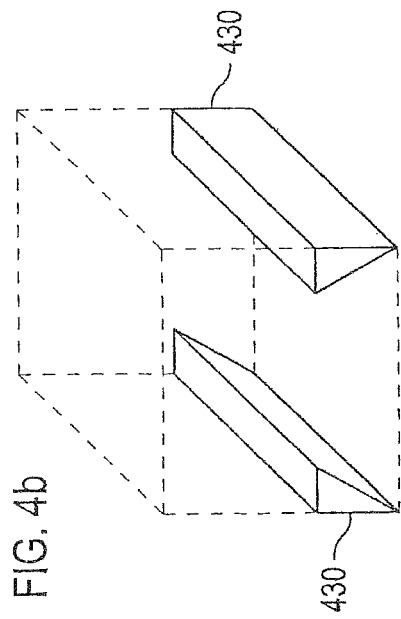
FIG. 4b shows a schematic illustration of a simple example of a second difference geometry.
Figure 4A:
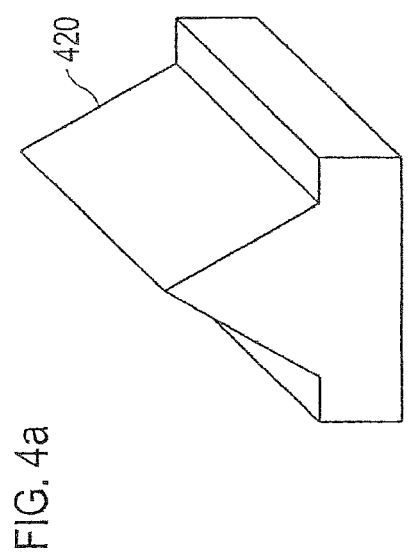
FIG. 4a shows a schematic illustration of a simple example of a second machining geometry.

Referring to the simple examples of the blank geometry, machining geometry, difference geometry, and finished part geometry in FIGS. 3a to 3d with an intermediate state of the workpiece in a machining geometry 320 at a first machining time $t_1$, FIG. 4a exemplarily illustrates the workpiece in a second intermediate state with a machining geometry 420 at a second machining time $t_2$, wherein material has been removed from the workpiece in the left upper part between the first machining time and the second machining time $t_2$ by one or more predetermined tool(s) 130 along one or more machining path(s). By comparing the second machining geometry 420 of the intermediate state at the second machining time $t_2$ with the finished part geometry 340 of the finished part, a new current difference geometry 430a, b results, as exemplarily shown in FIG. 4b. On the basis of this difference geometry 430a, b a new second machining path is determined and second path data for the second machining path is generated.

Figure 5:
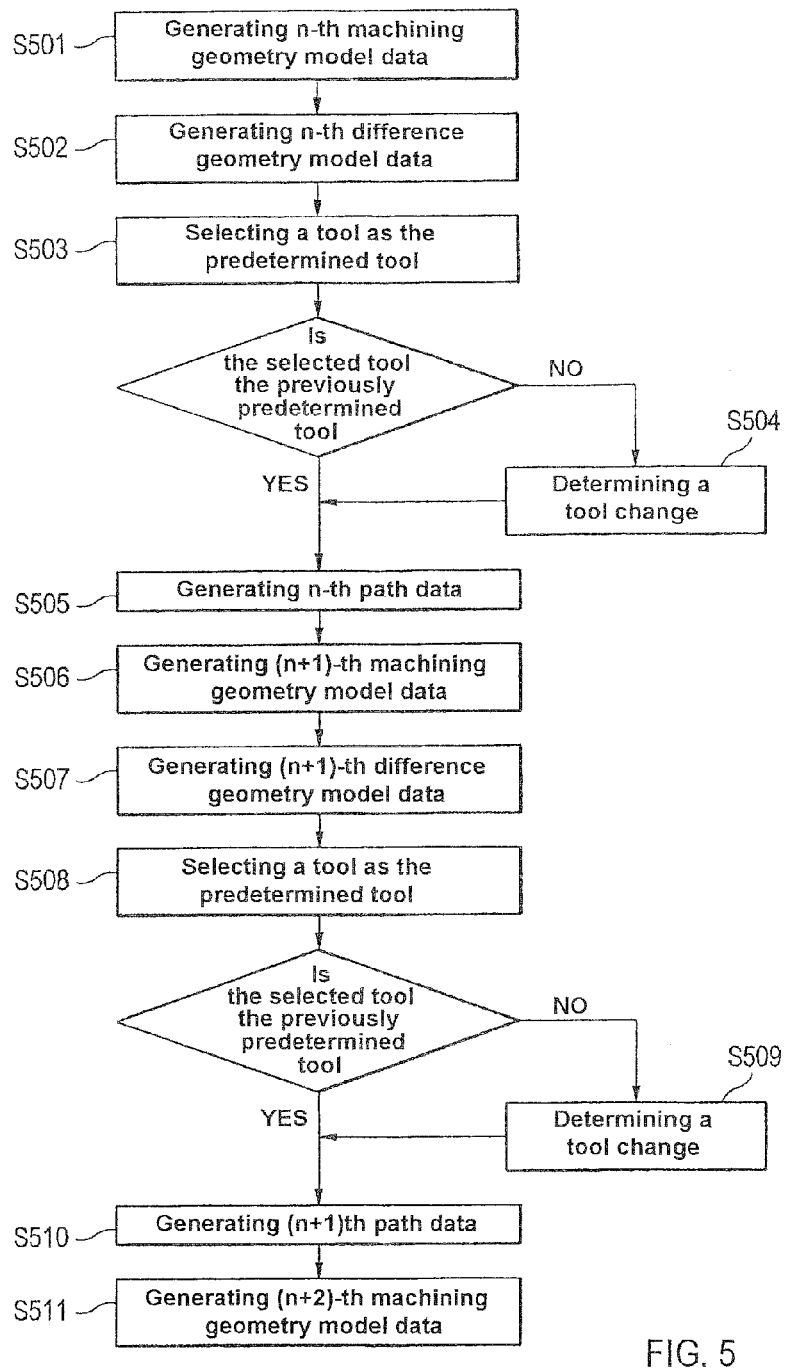
FIG. 5 shows a second embodiment of the method for generating control data according to the invention.

The sequence of method steps of the second embodiment of the method for generating control data is shown in FIG. 5. At a machining time $t_n$ the machining geometry model data of an intermediate state at the machining time $t_n$ are generated in step S501, "generating n-th machining geometry model data". Then the current difference geometry model data are compared with the current machining geometry at the n-th machining time $t_n$ on the basis of the comparison of the finished part geometry for generating n-th difference geometry model data in step S502, "generating n-th difference geometry model data".

To this end, finished part geometry model data is again required for the comparison of the current machining geometry with the finished part geometry. FIG. 5 shows an n-th repetition of the sequence of machining steps S201 to S204. In the embodiment of the method shown in FIG. 5 no step of providing finished part geometry model data is provided because it is assumed that the finished part geometry model data have already been provided in a first sequence of the method steps so that it is no longer required that finished part geometry model data have to be provided as of the second sequence, that is, the first repetition of the method steps.

In the next step S503, "selecting a tool as the predetermined tool", a tool is selected as the predetermined tool. In this case, the predetermined tool is that tool with which the control device 110 is equipped so that the control device 110 controls the predetermined tool 130 by the workpiece 150 for removing material of the workpiece 150. In another embodiment that is not shown in more detail here, in which the machine tool 100 comprises only one tool and no further tools 141*a-d* are contained in the tool magazine 140 or no tool magazine 140 is contained in the machine tool 100, this step S503 is not carried out.

Furthermore, in a machine tool 100 including a plurality of tools 141*a-d* in a tool magazine 140 having different tool characteristics, two essential possibilities arise. On the one hand, the tool selected as the predetermined tool for the n-th machining path may be equal to the predetermined tool for the (n−1)-th machining path. In this case, no change of the tool with which the control device 110 is equipped is required. In the second case, a tool is selected in step S503 as the predetermined tool for the n-th machining path, which is not equal to the tool predetermined for the (n−1)-th machining path. In this case, the step S504, "determining a tool change", follows in which a tool change is determined. This means that it is determined that the tool with which the control device 110 is equipped is exchanged for by a tool from the tool magazine 140 selected as the predetermined tool. For this purpose, the machine tool 100 comprises the tool changing device 142 for changing the tool 130 with which the control device is equipped.

Thus it is possible to change the predetermined tool during the machining of the workpiece 150 from a blank to a finished part, depending on the circumstances of the material of the workpiece yet to be removed, that is, depending on the current difference geometry of the workpiece. In practice, this case will occur, for example, if at first a tool having a large diameter is inserted in the control device 110 in order to achieve an actual machining volume as large as possible, wherein it is no longer possible to determine a further path as of a determined difference geometry in which the predetermined tool removes material from the workpiece without removing the finished part geometry of the workpiece. Then it will be necessary to select a tool having a smaller diameter from the tool magazine 140 and to exchange this tool for the previously predetermined tool having the large diameter.

In the next step S505, "generating n-th path data", an n-th machining path is determined on the basis of generated n-th path data, which the predetermined tool or an optionally new predetermined tool is to travel for removing material of the particular current difference geometry of the workpiece by feed at the machining time $t_n$. In step S505, "generating n-th path data", n-th path data is generated that indicates at which feed rate and with which tool orientation of the predetermined tool relative to the workpiece the predetermined tool is to travel the determined n-th machining path.

According to the invention, the n-th path data are generated on the basis of the particular current difference geometry at the machining time $t_n$ so that the tool predetermined for the n-th machining path removes a maximally large part of the volume of the particular n-th difference geometry of the workpiece per time unit when traveling the n-th machining path in dependence of the maximum machining volume of the tool predetermined for the n-th machining path.

This is performed in analogy to the first embodiment of the method for generating control data with the steps S201 to S204. After the tool predetermined for the n-th machining path has traveled the n-th machining path, a new machining geometry results, wherein in the next step S506, "generating (n+1)-th machining geometry model data", the (n+1)-th machining geometry model data as to the new current machining geometry at the machining time $t_{n+1}$ is generated after the tool predetermined for the n-th machining path has traveled the n-th machining path and removed material.

Subsequently, the steps S507, "generating (n+1)-th difference geometry model data", S508, "selecting a tool as the predetermined tool", optionally step S509, "determining a tool change", if the tool selected in step S508 is not equal to the predetermined tool for the n-th machining path, S510, "generating (n+1)-th path data", and S511, "generating (n+2)-th machining geometry model data", for another (n+2)-th machining path follow.

The steps in this pattern and this sequence S501 to S511, respectively, are repeated, if possible, until a machining geometry of the workpiece determined in step S511 is equal to the finished part geometry of the workpiece so that no more material has to be removed from the workpiece in order to achieve the finished part geometry.

Figure 6:
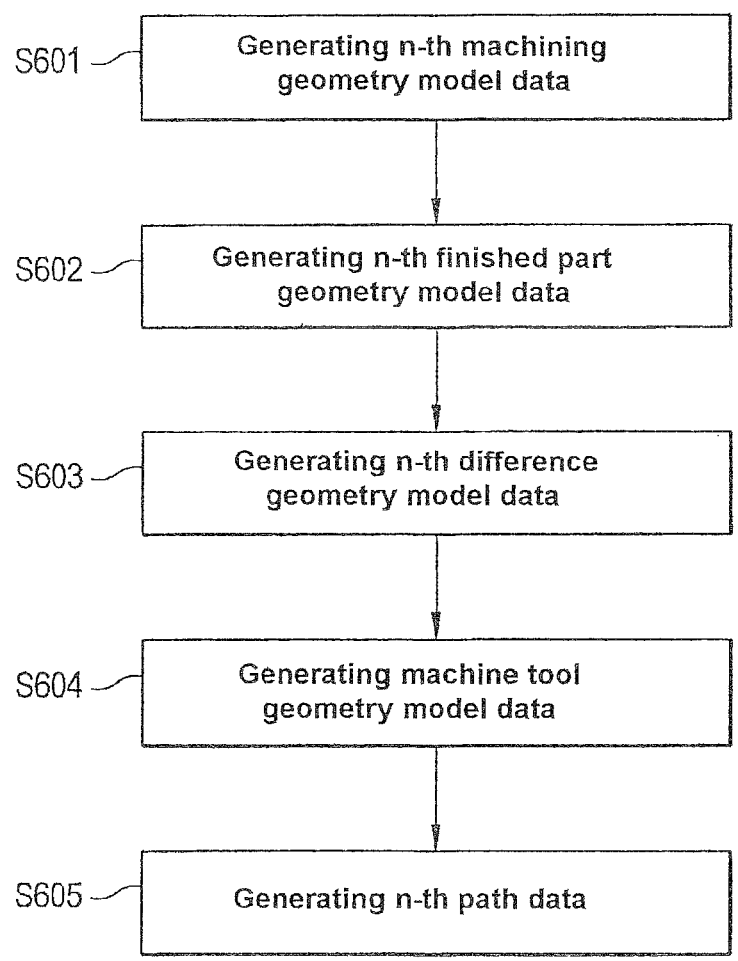
FIG. 6 shows a third embodiment of the method for generating control data according to the invention.

In a third embodiment of the method for generating control data according to the present invention, the method comprises a further step S604, "generating machine tool geometry model data". As shown in FIG. 6, the method then comprises steps S601, "generating n-th machining geometry model data", S602, "providing finished part geometry model data", S603, "generating n-th difference geometry model data", S604, "generating machine tool geometry model data", and S605, "generating path data for the n-th machining path".

Optionally, the sequence of method steps S601 to S605 is part of a sequence of method steps in which the steps are repeated, as in the second embodiment, so that machining paths are repeatedly determined. In this case, step S602, "providing finished part geometry model data", may optionally not occur in a further embodiment, as in the second embodiment, if the finished part geometry model data have already been provided because they were provided for determining a first machining path.

In step S604 machine tool geometry model data is generated that indicates a current machine tool geometry at a particular n-th machining time $t_n$, the current machine tool geometry comprising a current relative orientation and relative position of the predetermined tool 130, of elements of the control device 110 and of the clamping means 120 of the machine tool 100 for clamping the workpiece 150. Here, the n-th machining time $t_n$ is the machining time at which the n-th machining geometry model data was generated in step S601.

In step S605, "generating n-th path data", the n-th machining path is determined such that a collision of elements of machine tool 100 with elements of the machine tool 100 and of elements of the machine tool 100 other than the predetermined tool 130 for the n-th machining path with the workpiece 150 is prevented when the tool 130 predetermined for the n-th machining path travels the n-th machining path. Specifically, the n-th machining path is determined such that a collision of elements of the control device 110 of the machine tool 100 with elements of the machine tool 100 such as, for example, the clamping means 120, is prevented.

Furthermore, the n-th machining path is determined such that a collision of elements of the control device 110 with the clamped workpiece 150 is prevented so that only the predetermined tool 130 comes into contact with the workpiece 150 exclusively for the predetermined removal of material. This additionally requires a comparison of the machine tool geometry model data with the machining geometry model data of the workpiece 150 at the particular machining time $t_n$, so that on the basis of the comparison of the machining geometry model data and the machine tool geometry model data the position and site of the clamped workpiece 150 are known due to the knowledge of the position and site of the clamping means 120 relative to all elements of the machine tool 100, in particular to elements of the control device 110.

Thus, in step S605 only one respective machining path is determined which can be traveled by the tool predetermined for the n-th machining path such that no undesirable collision of elements of the control device 110 with elements of the clamping means 120, of elements of the control device 110 with the workpiece, and of elements of the control device 110 with elements of the machine tool 100 will occur. Here, a collision would be caused if elements of the control device 110 collided or came into contact with elements of the machine tool 100 or with the workpiece 150 such that the predetermined tool 130 could no longer travel the machining path. Thus, the path calculation in this embodiment is performed with an additional proactive collision check.

As machining paths are determined and path data is generated such that an actual machining volume as large as possible is achieved when the determined machining path is traveled by the predetermined tool 130 in the embodiments of the method for generating control data according to the present invention, machining paths are determined in practice that have a curvilinear, complicated profile due to the determined difference geometry of the workpiece.

Thus, when the machining path is traveled, the orientation of the predetermined tool 130 relative to the clamped workpiece 150 along the path, depending on the profile of the machining path is changed in dependence of the determined current difference geometry, as indicated in the generated path data. Furthermore, a feed rate of the predetermined tool 130 along the determined machining path is changed on the basis of the path data so that in dependence of the difference geometry the maximum machining volume of the predetermined tool is respectively achieved, if possible, along the determined machining path.

Apart from the changing tool orientation, this furthermore leads to constant changes of the feed rate along a determined machining path. Here, loads on the predetermined tool are caused because forces and torques act on the predetermined tool when it travels the determined machining path. Thus, a load of the tool is caused which, as expected, is much higher than in the method according to the previous prior art. In this case, it is to be noted that the feed values of all at least five axes and the load of the predetermined tool 130 resulting therefrom has an additive effect.

Thus, when a machining path is determined and the path data is generated, it is necessary to only determine machining paths and to only generate path data so that a load of the predetermined tool, that is, the load by forces and torques while it travels the predetermined machining path in dependence of the generated path data, does not exceed a maximally admissible load or one or two maximum load values of the predetermined tool 130.

Furthermore, machining paths are determined and path data is generated in dependence of admissible performance parameters and/or kinetic characteristics of the machine tool 100. This means that only machining paths are determined and the related path data is generated so that admissible performance parameters of the machine tool 100 are not exceeded and the kinetic characteristics of the machine tool 100 are taken into consideration. This means that only machining paths are determined and related path data is generated that are enabled on the basis of the maximally admissible performance parameters and the kinetic characteristics of the machine tool 100. The kinematics of the machine tool 100 comprises an orientability and mobility of the control device 100, feed values of the linear axes and/or rotary axes values (feed values of the rotary axes).

Figure 7:
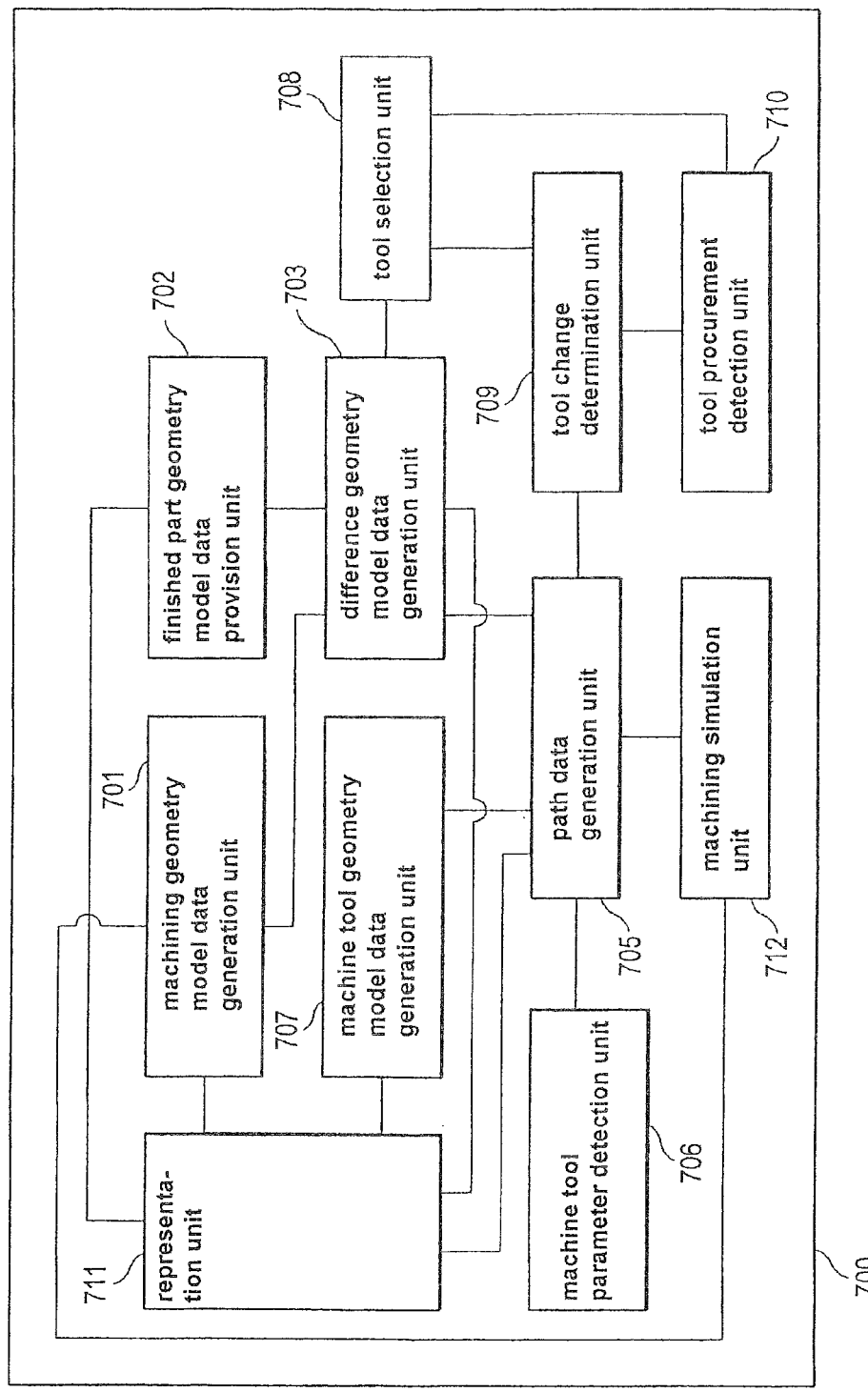
FIG. 7 shows an embodiment of the apparatus for generating control data according to the invention.

FIG. 7 shows an embodiment of the apparatus 700 for generating control data according to one of the described embodiments of the method for generating control data according to the present invention.

The apparatus 700 for generating control data comprises a machining geometry model data generation unit 701 and a finished part geometry model data provision unit 702. Furthermore, the apparatus 700 comprises a difference geometry model data generation unit 703 connected to the machining geometry model data generation unit 701 and the finished part geometry model data generation unit 702. The apparatus 700 moreover comprises a path data generation unit 705, the path data generation unit 705 being connected at least to the difference geometry model data generation unit 703.

The machining geometry model data generation unit 701 is suitable for repeatedly generating machining geometry model data of a machining geometry of the workpiece 150 at any machining time, the machining geometry describing the current removal state of the workpiece 150 at this machining time.

The finished part geometry model data provision unit 702 is suitable to provide finished part geometry model data, the finished part geometry model data describing the geometry of the finished part of the workpiece 150 which is to be achieved after the machining of the workpiece 150 on the machine tool 100 in one or more machining steps.

The difference geometry model data generation unit 703 is suitable to compare the respective machining geometry model data and the finished part geometry model data and to generate difference geometry model data for a respective machining geometry of the workpiece 150 at a particular machining time which model data indicates a current difference geometry of the workpiece 150 between the current machining geometry and the finished part geometry.

The difference geometry of the workpiece at the particular machining time exactly corresponds to the geometry of the material of the workpiece 150 at this machining time which has yet to be removed by one or more predetermined tool(s) 130 from the workpiece 150 in order to obtain the finished part geometry of the workpiece 150.

The path data generation unit 705 is suitable to determine a machining path on the basis of the determined current difference geometry which a predetermined tool 130 is to travel for removing material of the determined current difference geometry by feed. According to the invention, the machining path is determined on the basis of the current difference geometry of the workpiece 150 determined by the difference geometry model data generation unit 703.

The path data generation unit 705 is furthermore suited to generate path data on the basis of the generated difference geometry model data, the path data indicating at which feed rate and with which tool orientation of the predetermined tool relative to the workpiece 150 the predetermined tool 130 is to travel a determined machining path.

In this course, the path data are generated by the path data generation unit 705 with the proviso that the predetermined tool 130 removes a maximally large part of the volume of the determined current difference geometry of the workpiece 150 per time unit when traveling a machining path determined by the path data in dependence of the maximum machining volume of the predetermined tool 130.

Furthermore, the apparatus 700 for generating control data comprises a machine tool parameter detection unit 706 for detecting maximally admissible performance parameters and/or kinetic characteristics of the machine tool 100. The machine tool parameter detection unit 706 is connected to at least the path data generation unit 705 so that the path data is determined in dependence of the maximally admissible performance parameters and/or kinetic characteristics of the machine tool 100.

Furthermore, the apparatus 700 for generating control data comprises a machine tool geometry model data generation unit 707 for generating machine tool geometry model data describing a current machine tool geometry at any machining time of the workpiece 150. Here, the current machine tool geometry comprises a current relative orientation and relative position of the predetermined tool 130, of elements of the control device 110, and of clamping means 120 of the machine tool 100 for clamping the workpiece 150.

The machine tool geometry model data generation unit 707 is connected to at least the path data generation unit 705 so that the machining path and the related path data are determined by the path data generation unit 705 additionally on the basis of the machine tool geometry model data and/or on the basis of a comparison of the machine tool geometry model data with the machining geometry model data so that a collision of elements of the machine tool 100 with elements of the machine tool 100 and with elements of the machine tool 100, other than the predetermined tool 130 with the workpiece 150 is prevented while the predetermined tool 150 travels the determined machining path.

Furthermore, the apparatus 700 comprises a tool selection unit 708 connected to the path data generation unit 705, the tool selection unit 708 being suitable for repeatedly selecting a tool having a comparatively high maximum machining volume in dependence of the current difference geometry model data as the predetermined tool. For this purpose, the tool selection unit 708 is connected to a tool procurement detection unit 710 and a tool change determination unit 709.

The tool procurement detection unit 710 detects the tool procurement of the machine tool 100. This means that the tool procurement detection unit 710 detects the storage of tools 141a-d and 130 on the machine tool 100, and also detects the characteristics of the respective tools 141a-d and 130 so that the tool procurement detection unit 710 detects all tools 141 and 130 which can be determined as the predetermined tool 130 by the tool selection unit 708, the tool procurement detection unit 710 additionally detecting the respective maximum machining volume and/or the maximum load value(s) of the respective tools.

Thus, the tool selection unit 708 can determine a tool as the predetermined tool 130 in dependence of the maximum machining volume of this tool. The tool change determination unit 709 comprises the previously predetermined tool 130 on the machine tool, that is, the tool with which the control device 110 of the machine tool is equipped. In a case in which the tool selection unit 708 selects a tool as the predetermined tool 130 for another machining path, this predetermined tool 130 being a different one than the tool previously equipped in the control device 110 of the machine tool 100, the tool change determination unit 709 determines a tool change so that the tool with which the control device 110 of the machine tool 100 is equipped is exchanged for by the predetermined tool 130 determined for the next machining path.

Such tool change is necessary, for example, if material is yet to be removed from the workpiece 150 but the difference geometry is such that with the previous predetermined tool 130 it is no longer possible to determine a further machining path such that material is removed from the difference geometry without damaging the finished part geometry.

Furthermore, the apparatus 700 for generating control data comprises a representation unit 711 (e.g. a display unit) for visually representing (e.g. displaying) a virtual 3D model of the blank geometry, machining geometry, finished part geometry, difference geometry or machine tool geometry on the basis of the respective model data. Here, the representation unit 711 may visually display the individual virtual 3D models or at the same time a plurality of the geometries indicated by the model data. Moreover, the representation unit 711 enables the visual representation of a determined machining path by the difference geometry of the workpiece. Thereby, it is made possible for a manual operator of the machine tool 100 or the apparatus 700 to visually emulate or check the generated control data, the determined machining paths, the generated control data or also the machining states of the workpiece.

In an embodiment of the apparatus 700 for generating control data according to the present invention the apparatus 700 is directly connected to the machine tool 100 via an interface. Here, the apparatus 700 generates the control data according to one of the embodiments of the methods for generating control data according to the present invention directly while the workpiece 150 is machined on the machine tool 100. This means that the path data generation unit 705 generates path data which are then passed on immediately to the control device 110 of the machine tool 100 so that the control device 110 controls the predetermined tool 130 directly along the determined machining path on the basis of the generated path data and removes material from the workpiece 150.

After the determined machining path has been traveled by the predetermined tool 130 a new machining geometry of the workpiece results. This machining geometry is indicated by the machining geometry model data generation unit 701 through the generated machining geometry model data. Then, the apparatus 700 generates control data for the next machining step if the machining geometry does not yet match the intended finished part geometry. To this end, difference geometry model data of the current machining geometry are again generated so that another machining path can again be determined with the related path data.

Optionally, the tool change determination unit 709 initiates an actual tool change in which the tool 130 previously equipped in the control device 110 is exchanged for by another tool 141a-d coming from the tool magazine 140 as far as the tool selection unit 708 selects another tool than the predetermined tool 130 as the tool 130 predetermined for the next machining path. After the tool change has been carried out on the machine tool 100 another machining path is determined by the path data generation unit 705 generating path data. According to the invention, this is done on the basis of the current determined difference geometry with the proviso that a machining volume as large as possible be achieved when the new predetermined tool 130 travels along the determined machining path wherein, if possible, the maximum machining volume of the predetermined tool 130 is to be achieved.

The path data are directly passed on to the machine tool 100 via the interface so that the machine tool 100 controls the predetermined tool 130 on the basis of the generated control data with the control device 110 along the determined machining path on the basis of the generated path data so that material is removed from the workpiece 150. According to the second embodiment of the method for generating control data according to the present invention this may be repeated until the finished part and the finished part geometry of the workpiece 150, respectively, has been achieved.

The high data amount of generated model data, technology information and machine-specific data to be considered leads to such data traffic that such an "on-line solution" in which the apparatus 700 for generating control data is directly connected to the machine tool 100 is made difficult with regard to controlling the machine tool 100 during the machining of the workpiece 150 with a view to the calculation performance of today's computers.

For this reason, the apparatus 700 for generating control data in another embodiment of the present invention is not connected to an actual machine tool 100, but to a simulation device for simulating a virtual machine tool via an interface. Such a simulation device for a virtual machine tool which is suitable to simulate a simulation of the machining of a workpiece on a machine tool is disclosed, for example, by Applicant's DE 10 2006 043390 A1.

In this case, a machining path or a sequence of machining paths and optional tool changes is determined by generating corresponding path data by simulating the machining of the workpiece on a machine tool by virtually machining a virtual workpiece on a virtual machine tool by a simulation in an iterative approach to the optimum by running and evaluating simulation runs on a virtual machine tool that contains all characteristics required for controlling the machining process.

In this case, the optimum refers to a machining path or a sequence of machining paths and related path data, the machining path and the path data being determined according to the method according to the present invention such that the machining time of the workpiece is optimally reduced due to the selected or determined machining paths.

In this embodiment the apparatus 700 additionally comprises a machining simulation unit 712 for simulating the traveling of a machining path determined on the basis of path data generated by the path data generation unit 705 by a virtual predetermined tool, the machining geometry model data generation unit 701 generating machining geometry model data of a virtual 3D model of a machining geometry of the virtual workpiece which data describes a virtual removal state of the workpiece at a machining time after the traveling of a determined machining path by a virtual predetermined tool has been simulated by the machining simulation unit 712.

The finished part geometry provision unit 702 provides finished part geometry model data of a virtual 3D model of the finished part geometry, which describes a finished part geometry of the virtual workpiece, the difference geometry model data generation unit 703 generating current difference geometry model data on the basis of a comparison of the finished part geometry model data and the machining geometry model data, which current difference geometry model data describes a difference geometry of the material that yet has to be removed from the virtual workpiece in order to achieve the finished part geometry.

The path data generation unit 705 generates path data on the basis of the difference geometry model data, which path data determines a machining path with the proviso that the virtual predetermined tool removes a maximally large part of the volume of the difference geometry of the workpiece per time unit when the machining simulation unit simulates the traveling of the second machining path in dependence of a maximum machining volume for the predetermined tool.

In this embodiment the apparatus 700 or the virtual machine tool that is connected to the apparatus 700 for generating control data comprises a storage means for storing the generated control data, the determined machining paths, the related path data and optionally the determined tool changes. After the simulation has been finished, this data may be transferred to an actual machine tool so that this machine tool can machine an actual workpiece on the basis of the control data and by using an actual predetermined tool on the basis of the control data.

The embodiments and drawings stated here are to be understood as merely illustrative and not limiting. It is possible to combine the features described in the embodiments with each other in a deviating manner in order to provide further embodiments in this way that are optimized for the corresponding application. As far as such modifications are readily obvious to the person skilled in the art, they are to be implicitly disclosed by the above description of the embodiments.

For example, the apparatus 700 for generating control data shown in FIG. 7 was described with many technical features which are optional. For example, an apparatus 700 for generating control data according to the first embodiment of the method for generating control data only requires a machining geometry model data generation unit 701, a finished part geometry model data generation unit 702, a difference geometry model data generation unit 703 and a path data generation unit 705. All other units of the apparatus 700, as described in FIG. 7, are optional for this first embodiment of the method for generating control data.

The invention claimed is:

1. A method for generating control data for controlling a predetermined tool on a machine tool for machining a clamped workpiece from a blank to a finished part, comprising:

the step of generating path data by a hardware processor that indicates which machining path a predetermined tool is to travel at a feed rate and with a tool orientation relative to the workpiece, wherein generating machining geometry model data of a machining geometry of the workpiece, which describes the removal state of the workpiece at a particular machining time, providing finished part geometry model data which describes a finished part geometry of the workpiece, generating difference geometry model data which describes a difference geometry of material which has yet to be removed in order to achieve the finished part geometry, and generating path data on the basis of the difference geometry model data if the predetermined tool removes a maximally large part of the volume of the difference geometry of the workpiece per time unit while traveling the machining path in dependence of a maximum machining volume for the predetermined tool, wherein repeating one time or multiple times the steps of generating machining geometry model data, generating difference geometry model data, and generating path data on the basis of the difference geometry model data in this sequence, wherein at least second machining geometry model data of a second machining geometry of the workpiece and second difference geometry model data are generated at a particular second machining time upon a first repetition of the steps after a tool predetermined for a first machining path has traveled the first machining path on the basis of first path data, and second path data are generated on the basis of the second difference geometry model data if a tool predetermined for a second machining path removes a maximally large part of the volume of the second difference geometry of the workpiece per time unit while traveling the second machining path in dependence of a maximum machining volume.

2. The method of claim 1, further wherein repeating one time or multiple times the steps of providing tool procurement data which describes the tool procurement of the machine tool and indicates which tool characteristics the tools of the tool procurement of the machine tool have, and selecting a tool based on a maximum machining volume of the tool in dependence of the difference geometry model data as the predetermined tool for a next machining path, and optionally repeating one time or multiple times a step of determining a tool change of a previously predetermined tool by a tool selected for a next machining path in dependence of the tool procurement of the machine tool.

3. The method of claim 1, wherein the machine tool comprises a control device for controlling the predetermined tool, the control device enabling the control of the predetermined tool relative to the clamped workpiece with a three-dimensional free tool movement and a free tool orientation about at least 5 axes, and the path data being generated such that when traveling a machining path determined on the basis of the difference geometry, the predetermined tool changes the feed direction, the feed rate and/or the orientation relative to the clamped workpiece in dependence of the difference geometry.

4. The method of claim 1, wherein the path data is generated additionally in dependence of performance parameters and/or kinetic characteristics of the machine tool such that maximum performance parameters and/or kinetic characteristics of the machine tool are not exceeded when a predetermined tool travels a machining path determined on the basis of the path data.

5. The method of claim 1, wherein the path data is generated additionally in dependence of one or more maximum load values of the at least one predetermined tool such that a load of a predetermined tool while traveling a machining path determined on the basis of the path data does not exceed the one or more maximum load values of the predetermined tool.

6. The method of claim 3, wherein repeating one time or multiple times a step of generating machine tool geometry model data which describes a machine tool geometry at a particular machining time of the workpiece, wherein the machine tool geometry comprises a relative orientation and relative position of the predetermined tool, of elements of the control device and of clamping means of the machine tool for clamping the workpiece, wherein the path data is generated additionally on the basis of the machine tool geometry model data and/or on the basis of a comparison of the machine tool geometry model data with the machining geometry model data at the particular machining time if a collision of elements of the machine tool with elements of the machine tool and of elements of the machine tool other than the predetermined tool with the workpiece while a machining path determined on the basis of the generated path data is traveled by the predetermined tool is prevented.

7. The method of claim 1, wherein the model data is suited to generate a virtual 3D model of a blank geometry, the machining geometry, the finished part geometry, the difference geometry and/or the machine tool.

8. The method of claim 7, wherein the path data is generated on the basis of a simulation of the machining of a virtual workpiece on a virtual machine tool, the simulation comprising the following steps:

generating a virtual 3D model of the workpiece in a raw state, generating first path data including determining a first machining path for a virtual predetermined tool, simulating the traveling of the determined first machining path on the basis of the generated first path data by the virtual predetermined tool, generating machining geometry model data of a virtual 3D model of a machining geometry of the virtual workpiece, which describes a virtual removal state of the workpiece at a machining time after the traveling of the first determined machining path by a virtual predetermined tool was simulated, providing finished part geometry model data of a virtual 3D model of the finished part geometry, which describes a finished part geometry of the virtual workpiece, generating difference geometry model data which describes a difference geometry of the material which yet has to be removed from the virtual workpiece in order to achieve the finished part geometry, and generating second path data including determining a second machining path on the basis of the difference geometry model data if the virtual predetermined tool removes a maximally large part of the volume of the difference geometry of the workpiece per time unit upon simulation of the traveling of the second machining path in dependence of a maximum machining volume for the predetermined tool.

9. The method for generating control data of claim 1, wherein the path data is generated in the step of generating path data such that a machining path is determined in a plurality of interconnected machining path sections, a machining path starting point being determined in dependence of the difference geometry, wherein a first machining path section is determined starting from the machining path starting point in dependence of the difference geometry such that the machining volume is maximized starting from the machining path starting point and wherein a further machining path section is determined starting from an end point of each of the plurality of interconnected machining path sections in dependence of the difference geometry such that the machining volume is maximized starting from the end point of the previous machining path section and no material of the finished part geometry is removed along the first and the further machining sections.

10. An apparatus including a hardware processor for generating control data for controlling a predetermined tool on a machine tool for machining a clamped workpiece from a blank to a finished part, comprising:

a path data generation unit for generating path data indicating which machining path a predetermined tool is to travel at which feed rate and with which tool orientation relative to the workpiece, wherein a machining geometry model data generation unit for generating machining geometry model data of a machining geometry of the workpiece, which describes a removal state of the workpiece at a particular machining time, a finished part geometry model data provision unit for providing finished part geometry model data which describes a finished part geometry of the workpiece, a difference geometry model data generation unit for generating difference geometry model data which describes a difference geometry of material that has yet to be removed in order to achieve the finished part geometry, wherein the path data generation unit generates path data on the basis of the difference geometry model data if the predetermined tool removes a maximally large part of the volume of the difference geometry of the workpiece per time unit while traveling the machining path in dependence of a maximum machining volume for the predetermined tool, wherein the apparatus repeats one time or multiple times:
generating machining geometry model data,
generating difference geometry model data, and generating path data on the basis of the difference geometry model data in this sequence, wherein at least second machining geometry model data of a second machining geometry of the workpiece and second difference geometry model data are generated at a particular second machining time upon a first repetition of the steps after a tool predetermined for a first machining path has traveled the first machining path on the basis of first path data, and second path data are generated on the basis of the second difference geometry model data if a tool predetermined for a second machining path removes a maximally large part of the volume of the second difference geometry of the workpiece per time unit while traveling the second machining path in dependence of a maximum machining volume.

11. The apparatus of claim 10, wherein the apparatus comprises a machine tool parameter detection unit for detecting admissible performance parameters and/or kinetic characteristics of the machine tool, the path data generation unit generating the path data with the additional proviso that maximum performance parameters and/or kinetic characteristics of the machine tool are not exceeded when a predetermined tool travels a machining path determined on the basis of the path data.

12. The apparatus of claim 10, wherein the apparatus comprises a tool characteristic detection unit for detecting tool characteristics of the tool of the machine tool, the tool characteristics including one or more maximum load values of the tools and the path data generation unit generating the path data with the additional proviso that one or more load values of the predetermined tool does not exceed the one or more maximum load values of the predetermined tool when it travels the machining path determined on the basis of the path data.

13. The apparatus of claim 10, wherein the apparatus comprises a tool procurement detection unit for detecting a tool procurement of the machine tool, a tool selection unit for selecting a tool from the detected tool procurement based on a maximum machining volume of the tool in dependence of the difference geometry model data as the predetermined tool for a next machining path, and a tool change determination unit for determining a tool change of the previously predetermined tool by a predetermined tool selected for the next machining path in dependence of the detected tool procurement of the machine tool, the tool change determination unit determining a tool change if a tool other than the previously predetermined tool is selected for the next machining path from the tool procurement of the machine tool by the tool selection unit for the next machining path.

14. The apparatus of claim 10, wherein the apparatus comprises a machine tool geometry model data generation unit for generating machine tool geometry model data which describes a current machine tool geometry at a particular machining time of the workpiece, the machine tool geometry comprising an orientation and position of the predetermined tool, of elements of a control device and of clamping means of the machine tool for clamping the workpiece, wherein the path data generation unit furthermore generates the path data on the basis of the machine tool geometry model data and/or on the basis of a comparison of the machine tool geometry model data with the machining geometry model data at the particular machining time with the additional proviso that a collision of elements of the machine tool with elements of the machine tool and of elements of the machine tool other than the predetermined tool with the workpiece while the machining path determined by the path data is traveled by the predetermined tool is prevented.

15. The apparatus of claim 10, wherein the apparatus comprises a display unit for visually displaying a virtual 3D model of a blank geometry, an intermediate geometry, the finished part geometry, the difference geometry and/or the machine tool.

16. The apparatus of claim 10, wherein
the path data generation unit generates the path data on the basis of a simulation of the machining of a virtual workpiece on a virtual machine tool, the apparatus furthermore comprising a machining simulation unit for simulating the traveling of a machining path determined on the basis of path data generated by the path data generation unit by a virtual predetermined tool, wherein
the machining geometry model data generation unit generates machining geometry model data of a virtual 3D model of a machining geometry of the virtual workpiece, which describes a virtual removal state of the workpiece at a machining time after the traveling of a first determined machining path by a virtual predetermined tool was simulated by the machining simulation unit,
the finished part geometry provision unit provides finished part geometry model data of a virtual 3D model of the finished part geometry, which describes a finished part geometry of the virtual workpiece,
the difference geometry model data generation unit generates difference geometry model data which describes a difference geometry of the material that has yet to be removed from the virtual workpiece in order to achieve the finished part geometry, and
the path data generation unit generates second path data determining a second machining path on the basis of the difference geometry model data if the virtual predetermined tool removes a maximally large part of the volume of the difference geometry of the workpiece per time unit upon simulation of the traveling of the second machining path by the machining simulation unit in dependence of a maximum machining volume for the predetermined tool.

17. A method for generating control data for controlling a predetermined tool on a machine tool for machining a clamped workpiece from a blank to a finished part, comprising:
the step of generating path data by a hardware processor that indicates which machining path a predetermined tool is to travel at what feed rate and with which tool orientation relative to the workpiece, wherein
generating machining geometry model data of a machining geometry of the workpiece, which describes a removal state of the workpiece at a particular machining time,
providing finished part geometry model data which describes a finished part geometry of the workpiece,
generating difference geometry model data which describes a difference geometry of material which has yet to be removed in order to achieve the finished part geometry, and
generating path data on the basis of the difference geometry model data if the predetermined tool removes a maximally large part of the volume of the difference geometry of the workpiece per time unit while traveling the machining path in dependence of a maximum machining volume for the predetermined tool,
wherein the machine tool comprises a control device for controlling the predetermined tool, the control device enabling the control of the predetermined tool relative to the clamped workpiece with a three-dimensional free tool movement and a free tool orientation about at least 5 axes, and the path data being generated such that when traveling a machining path determined on the basis of the difference geometry, the predetermined tool changes the feed direction, the feed rate and/or the orientation relative to the clamped workpiece in dependence of the difference geometry, wherein repeating one time or multiple times a step of generating machine tool geometry model data which describes a machine tool geometry at a particular machining time of the workpiece, wherein the machine tool geometry comprises a relative orientation and relative position of the predetermined tool, of elements of the control device and of clamping means of the machine tool for clamping the workpiece, and wherein the path data is generated additionally on the basis of the machine tool geometry model data and/or on the basis of a comparison of the machine tool geometry model data with the machining geometry model data at the particular machining time if a collision of elements of the machine tool with elements of the machine tool and of elements of the machine tool other than the predetermined tool with the workpiece while a machining path determined on the basis of the generated path data is traveled by the predetermined tool is prevented.

18. A method for generating control data for controlling a predetermined tool on a machine tool for machining a clamped workpiece from a blank to a finished part, comprising:

the step of generating path data by a hardware processor that indicates which machining path a predetermined tool is to travel at what feed rate and with which tool orientation relative to the workpiece, wherein generating machining geometry model data of a machining geometry of the workpiece, which describes a removal state of the workpiece at a particular machining time, providing finished part geometry model data which describes a finished part geometry of the workpiece, generating difference geometry model data which describes a difference geometry of material which has yet to be removed in order to achieve the finished part geometry, and generating path data on the basis of the difference geometry model data if the predetermined tool removes a maximally large part of the volume of the difference geometry of the workpiece per time unit while traveling the machining path in dependence of a maximum machining volume for the predetermined tool, wherein the model data is suited to generate a virtual 3D model of a blank geometry, the machining geometry, the finished part geometry, the difference geometry and/or the machine tool, and wherein the path data is generated on the basis of a simulation of the machining of a virtual workpiece on a virtual machine tool, the simulation comprising the following steps:

generating a virtual 3D model of the workpiece in a raw state, generating first path data including determining a first machining path for a virtual predetermined tool, simulating the traveling of the determined first machining path on the basis of the generated first path data by the virtual predetermined tool, generating machining geometry model data of a virtual 3D model of a machining geometry of the virtual workpiece, which describes a virtual removal state of the workpiece at a machining time after the traveling of the first determined machining path by a virtual predetermined tool was simulated, providing finished part geometry model data of a virtual 3D model of the finished part geometry, which describes a finished part geometry of the virtual workpiece, generating difference geometry model data which describes a difference geometry of the material which yet has to be removed from the virtual workpiece in order to achieve the finished part geometry, and generating second path data including determining a second machining path on the basis of the difference geometry model data if the virtual predetermined tool removes a maximally large part of the volume of the difference geometry of the workpiece per time unit upon simulation of the traveling of the second machining path in dependence of a maximum machining volume for the predetermined tool.

* * * * *